INVENTOR
Harry Rinnman

United States Patent Office 3,422,449
Patented Jan. 14, 1969

3,422,449
EYEGLASSES WITH ADJUSTABLE MAGNETICALLY ATTACHED TEMPLES
Harry Rinnman, 28 N. 1st St., Geneva, Ill. 60134
Filed May 4, 1964, Ser. No. 364,581
U.S. Cl. 351—121
Int. Cl. G02c 5/14; G02c 5/00
1 Claim

ABSTRACT OF THE DISCLOSURE

Eyeglasses having matching magnets at the ends of the lens frame and at the forward portion of each temple to supplant the hinges and provide a slidably adjustable joint.

---

The present invention relates to a new structural design using permanent magnets to replace the usual hinges in eye-glass frames. The construction enables the user to quickly adjust the glasses precisely to his personal needs.

An important object of the invention is to provide a new and novel device of the character described, with a permanent magnet embedded at the hinge locations in both sides of the frame. Matching permanent magnets will be embedded in the usual hinge locations at the forward end of each temple, replacing the hinges entirely. When assembled, the magnets will hold the frame together firmly and securely in use as hinges do. The magnetic design is completely adjustable vertically, horizontally, and the lenses may be tilted, raised, lowered, moved forward, or backward to suit the exact needs of the user. Those skilled in the art, will understand that the two magnets placed together are resistingly yielding to a sliding and/or turning pressure; and exert their maximum holding power against separation by straight pull. These special properties of permanent magnets make them ideal for the new improvements. Another important object of the invention is to provide a new and novel device of the character described, with a set of permanent magnets embedded in the locations now having hinges affixed thereto. The free and easy adjustment of the glasses provided by this new design makes reading and/or viewing in a reclining position exceptionally relaxing. This feature is especially enjoyable for bi-focal users.

Extreme variations in temperatures, from very cold to stifling hot, affect the fit of the glasses causing slipping and discomfort. Quick, simple adjustment corrects the cause.

While the foregoing statements are indicative of the general nature of the invention, other more specific objects and advantages will be apparent to those skilled in the art upon a full understanding of the construction, arrangement, and function of the several parts which have been combined to form the new and novel magnetic, wearer-adjustable, spectacles.

A preferred embodiment of the invention is illustrated in the accompanying drawing, in which.

Figure 1:
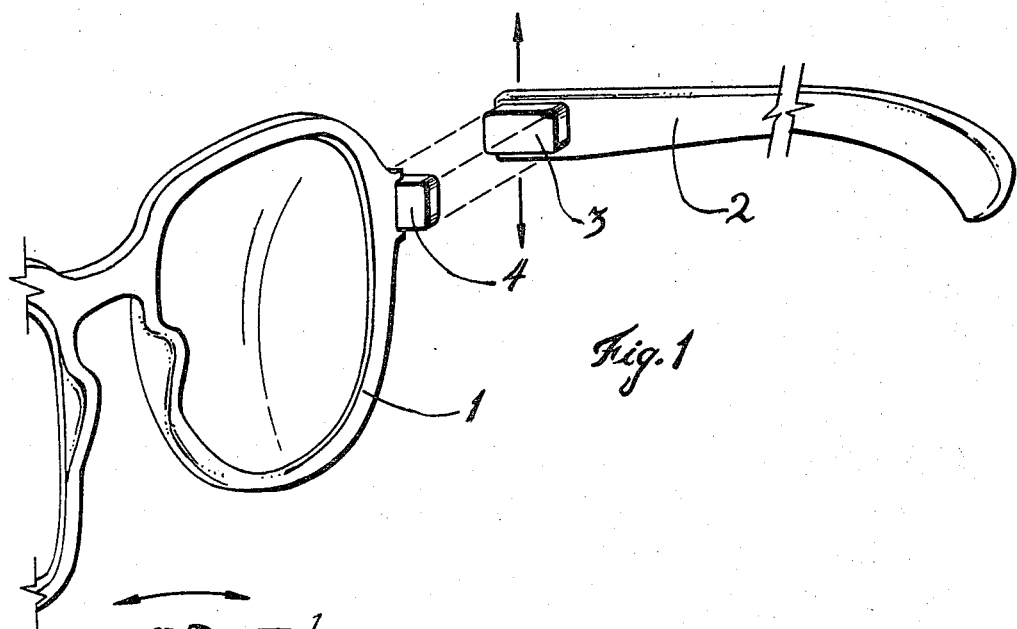
FIGURE 1 is an exploded perspective view of the eyeglasses.
Figure 2:
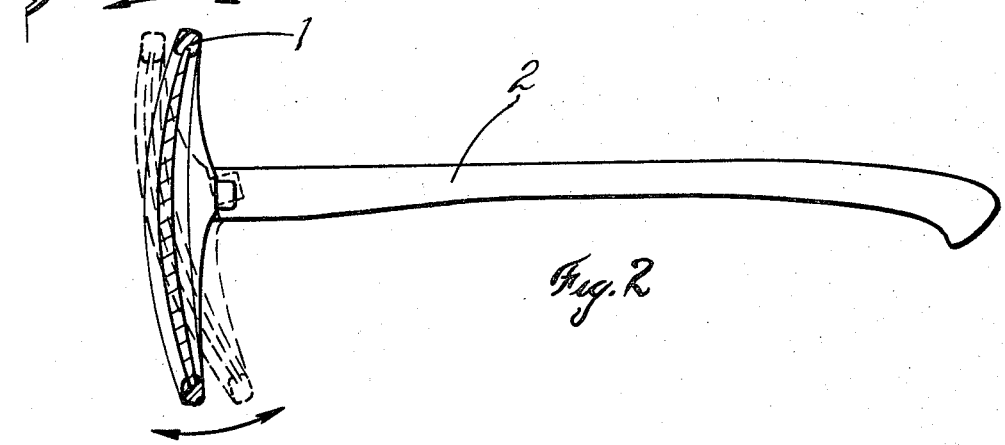
FIGURE 2 is an elevation view of the eyeglasses.
Figure 3:
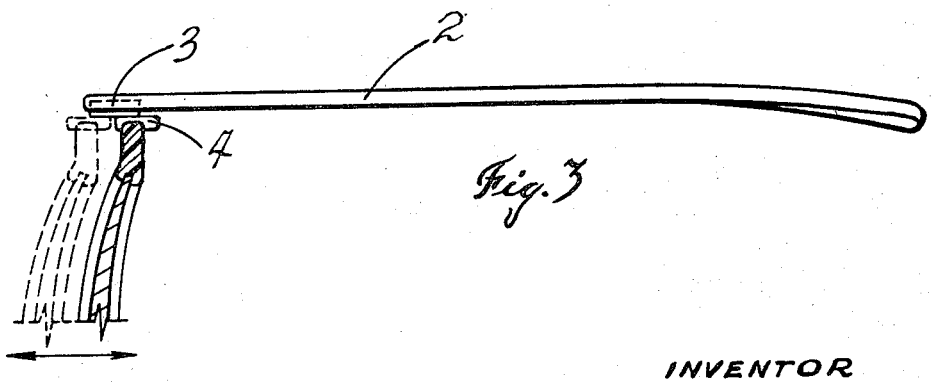
FIGURE 3 is a fragmentary plan view of the eyeglasses.

As shown in the drawing figures, the lens frame 1 of the eyeglasses has an elongated permanent magnet 4 partially embedded in each outer end, the magnet having a flat exposed outer face. Each temple 2 has a corresponding elongated permanent magnet 3 partially embedded in its forward inner end, with a flat exposed face. The flat faces are held in contact by magnetic attraction and, as shown in FIGURES 2 and 3 by solid and broken lines, enable both pivotal and sliding adjustments between the lens frame and the temples.

This combination of adjustments, vertical, tilting, and horizontal gives the user complete control to suit his personal needs of the moment and to meet all conditions.

Vertical adjustment assures the user perfect vision for general use as in driving a car. Using bi-focals the driver can see long distances on the road and view the instrument panel by moving only his eyes.

Tilting prevents the glasses from slipping down on the nose, when the user perspires. Tilting permits viewing TV from a relaxed reclining position, or reading in bed, very comfortable with bi-focals. Tilting also permits a special adjustment for comfort in long hours of working at a desk.

Horizontal adjustments eliminate the annoyance of eyelashes brushing against the lenses. Any extreme change of temperature loosening the glasses on the head is corrected quickly and easily by horizontal adjustment.

Another important feature of the invention is that it simplifies fitting for the manufacturer and the optometrist as well as the user.

The manufacturer can reduce the number of sizes and models because his only concern regarding size is the width of the customer's head. He has a choice, he can affix the magnets with adhesives, or by inserts in plastic molding or use any suitable means such as riveting etc.

The optometrist is also concerned only with the width of the customers head and distance between the eyes as the other adjustments are quickly made in his office. This saves him considerable time.

The user is happy about being able to make his own adjustments to suit the prevailing conditions, thereby eliminating the need for a visit to the optometrist.

I claim:
1. Adjustable eyeglasses comprising a lens frame and temple members, said lens frame having an elongated permanent magnet secured at each outer end, with a flat exposed outer face extending generally at right angles to said lens frame, each temple having a corresponding elongated permanent magnet secured to its inner forward end and having a flat exposed face magnetically held against the outer face of the respective lens frame magnet, said magnets constituting the sole connection between the lens frame and temple members, and enabling sliding and pivotal adjustment of the temples relative to the lens frame.

References Cited

UNITED STATES PATENTS

| 2,426,266 | 8/1947 | Haas | 351—118 X |
| 2,613,104 | 10/1952 | Parsons. | |
| 3,152,716 | 10/1964 | Feldhann. | |
| 3,271,094 | 9/1966 | Wildermuth | 351—120 |
| 2,920,327 | 1/1960 | Singer | 351—158 X |

FOREIGN PATENTS 915,421  7/1946  France.

DAVID H. RUBIN, Primary Examiner.

U.S. Cl. X.R.
351—120, 140